US007899078B1

(12) United States Patent
Lai et al.

(10) Patent No.: US 7,899,078 B1
(45) Date of Patent: Mar. 1, 2011

(54) SYSTEM AND METHOD FOR CONTROLLING POWER SAVING FUNCTIONS OF A WIRELESS COMMUNICATION STATION

(75) Inventors: Duc Dinh Lai, Chantilly, VA (US); Julio Palacio, Alpharetta, GA (US)

(73) Assignee: Nextel Communications Inc., Reston, VA (US)

( * ) Notice: Subject to any disclaimer, the term of this patent is extended or adjusted under 35 U.S.C. 154(b) by 1146 days.

(21) Appl. No.: 11/486,155

(22) Filed: Jul. 14, 2006

(51) Int. Cl.
*H04J 3/22* (2006.01)
*H04B 1/38* (2006.01)

(52) U.S. Cl. ........................ 370/469; 455/557

(58) Field of Classification Search .................. 370/469,
370/328, 338–340, 353, 354, 360, 392, 395.3,
370/395.5, 395.42, 419, 359, 463, 401–405,
370/467, 230, 235, 252–256, 422, 465, 466,
370/474, 349, 216, 347, 320, 397, 345; 455/558,
455/556.1, 557, 418, 414.1–414.4, 550.1,
455/422.1, 517–519, 90.1–90.3, 445, 512,
455/509, 521, 524, 527, 450, 455, 500, 507,
455/403, 466; 719/328, 330, 331, 222; 717/176,
717/178
See application file for complete search history.

(56) References Cited

U.S. PATENT DOCUMENTS

| 2002/0099871 | A1* | 7/2002 | Vargas et al. | 709/328 |
| 2002/0147853 | A1* | 10/2002 | Sherman et al. | 709/310 |
| 2002/0184407 | A1* | 12/2002 | Shell et al. | 709/328 |
| 2003/0083080 | A1* | 5/2003 | Fournier et al. | 455/466 |
| 2006/0222009 | A1* | 10/2006 | Yao et al. | 370/469 |
| 2007/0211654 | A1* | 9/2007 | Kim et al. | 370/318 |

OTHER PUBLICATIONS

Windows Mobile, "Radio Interface Layer (RIL) White Paper", Microsoft Corporation, published Jun. 2004.

* cited by examiner

*Primary Examiner*—Melody Mehrpour

(57) ABSTRACT

Systems and methods for controlling power saving functions of wireless communication stations are provided. A radio interface layer is provided between an operating system and a wireless modem. The radio interface layer controls reinitialization of the operating system and wireless modem when a notification associated with a dispatch communication service is received from a wireless communication network.

18 Claims, 3 Drawing Sheets

SYSTEM AND METHOD FOR CONTROLLING POWER SAVING FUNCTIONS OF A WIRELESS COMMUNICATION STATION

CROSS-REFERENCE TO RELATED APPLICATIONS

The present application is related to U.S. patent application Ser. No. 11/156,628 entitled "Method and Computer-Readable Medium for Controlling Operations of a Dual-Dialer State Machine" filed Jun. 21, 2005, the entire disclosure of which is herein expressly incorporated by reference.

BACKGROUND OF THE INVENTION

Wireless communications systems typically provide interconnect and/or dispatch voice communication services. Interconnect voice communication services are full-duplex and are typically provided by most wireless carriers as circuit-switched communications. Dispatch communication services are half-duplex and are commonly known as walkie-talkie or push-to-talk (PTT) types of calls, such as the service provided by Sprint Nextel Corporation under the trade name Direct Connect.

Wireless communication stations (such as cellular telephones, personal digital assistants (PDAs), laptop computers and/or the like) operate using a combination of hardware and software. As illustrated in FIG. 1a, a communications architecture for a wireless communication station includes a radio interface layer (RIL) 110 interposed between an operating system 105 and wireless modem 115. Radio interface layer 110 interfaces operating system 105 (and any associated applications or programs) with wireless modem 115, which allows the development of telephony services for operating system 105 independent of the particular type of wireless modem being implemented. For more information on a radio interface layer the interested reader is referred to "Radio Interface Layer (RIL) White Paper" by Microsoft Corporation (June 2004), the entire disclosure of which is herein expressly incorporated by reference.

While there has been much development of radio interface layers for interconnect voice communication services, there has been very little development of a radio interface layer that also provides functionality for dispatch communication services.

SUMMARY OF THE INVENTION

One area that has not been developed for radio interface layers for dispatch communication services is power management functions. Most wireless communication stations can enter a sleep state in order to conserve battery power. These sleep states require a coordination between the operating system and the wireless modem.

Exemplary embodiments of the present invention provide a radio interface layer that interfaces between an operating system and wireless modem of a wireless communication station in order to provide power saving functionality. In accordance with one aspect of the present invention, while an operating system and wireless modem are in a sleep state and the wireless modem receives a notification from a wireless network, the radio interface layer determines a type of wireless communication service associated with the notification and reinitializes the operating system and wireless modem based on the notification type and a saved operating mode of the operating system and wireless modem.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
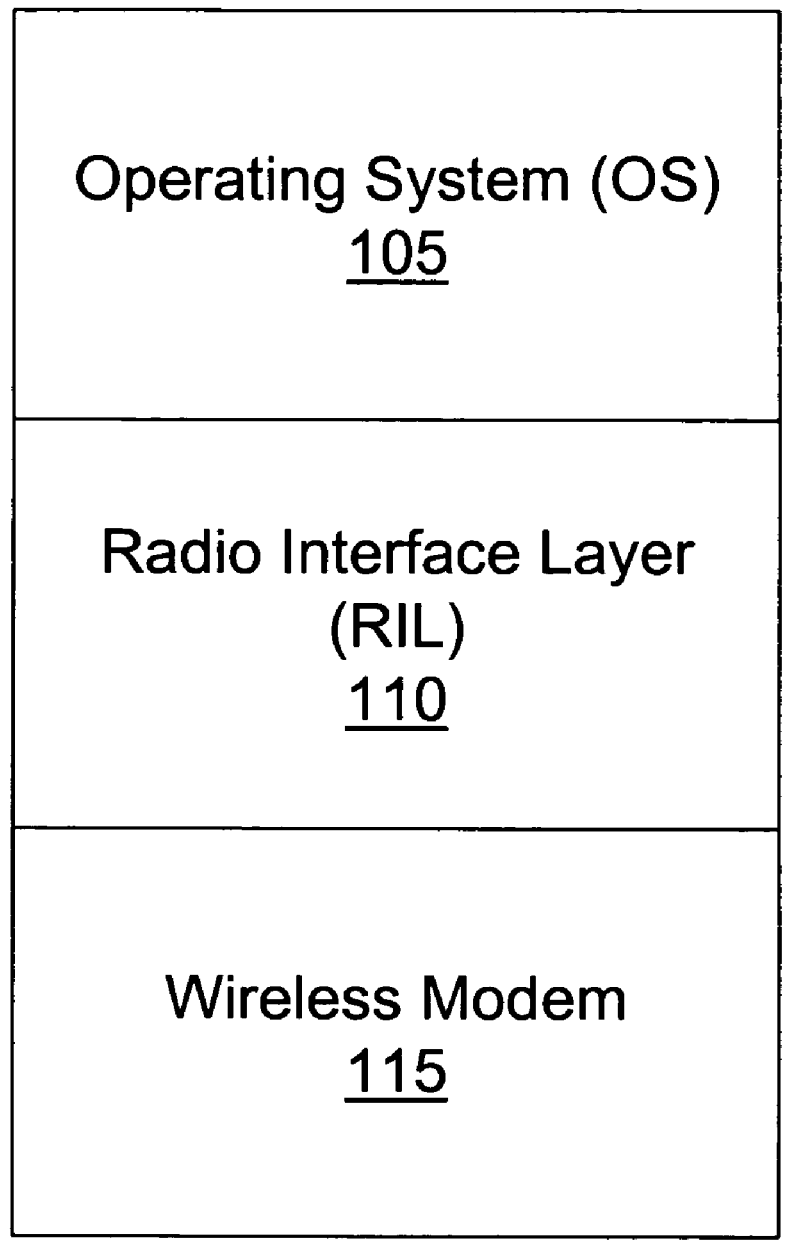
FIG. 1a is a block diagram of a conventional wireless communications station architecture.
Figure 1B:
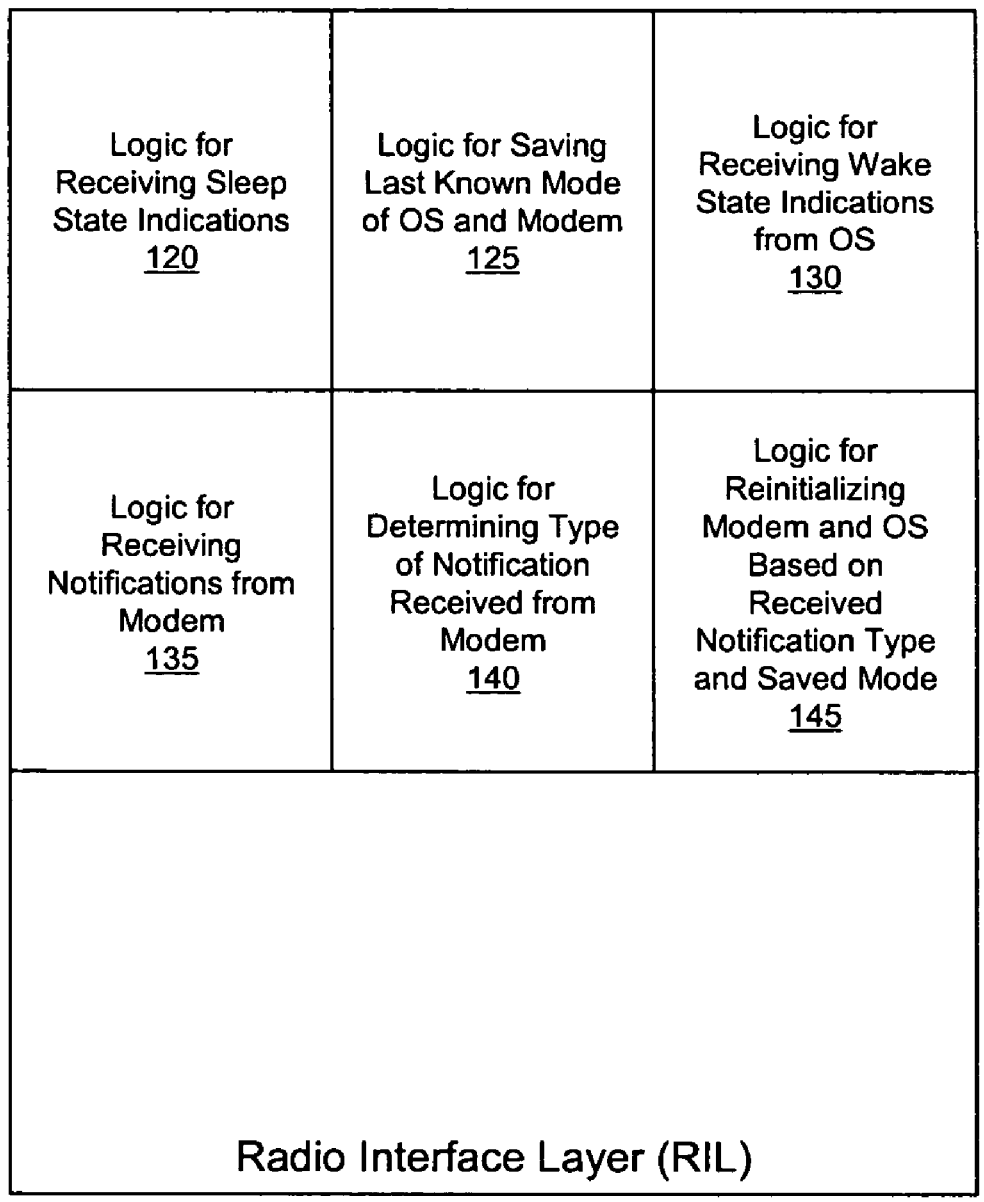
FIG. 1b is a block diagram of an exemplary radio interface layer (RIL) in accordance with the present invention.

As illustrated in FIG. 1b, the radio interface layer of the present invention provides power management techniques for wireless communication stations that include dispatch communication functionality using logic 120-145, which will be described in more detail below. Logic 120-145 can be implemented as software, such as processor-executable code, and/or hardware, such as an application specific integrated circuit (ASIC) or field programmable gate array (FPGA).

Figure 2:
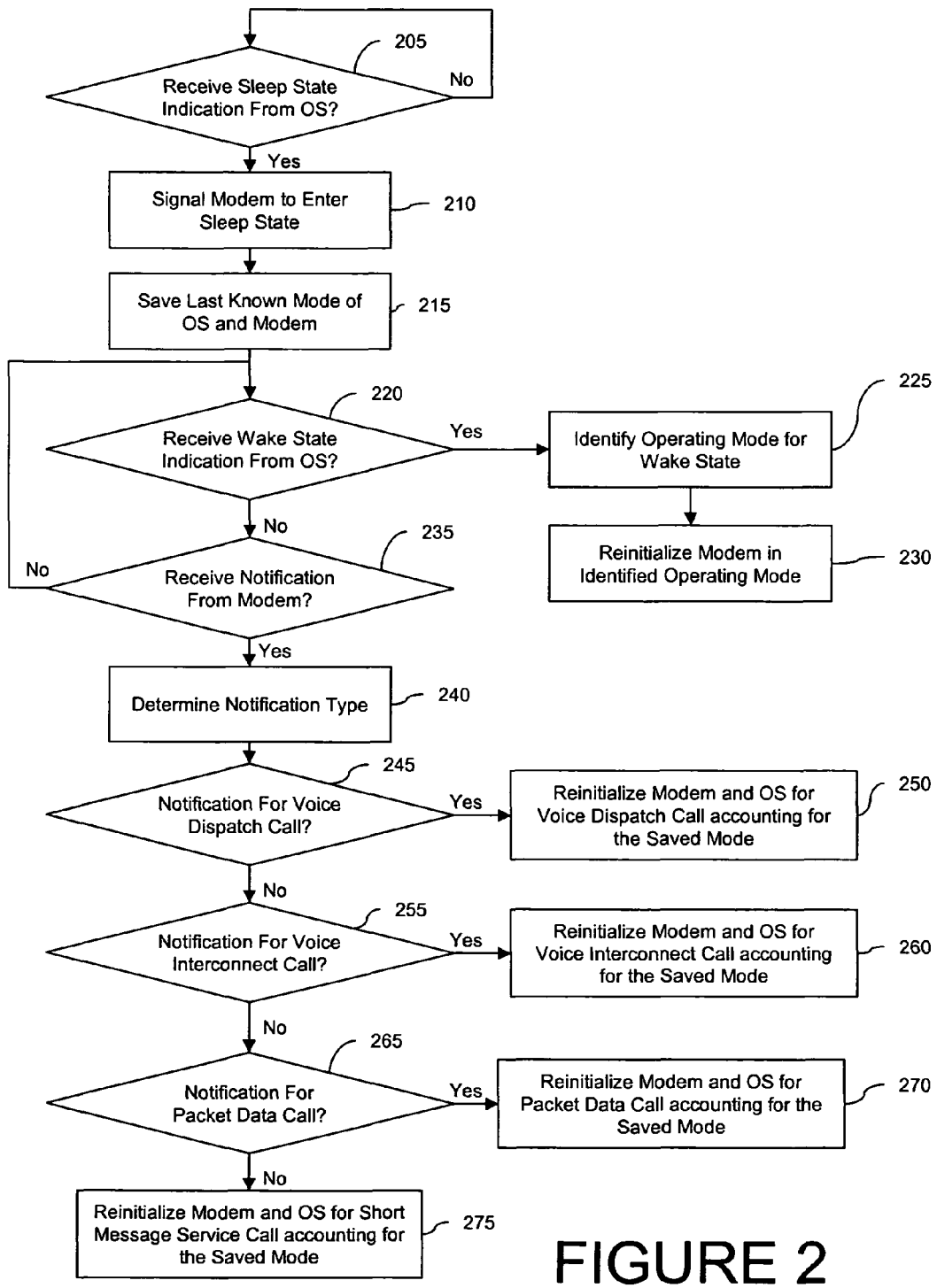
FIG. 2 is a flow diagram of an exemplary method in accordance with the present invention.

FIG. 2 is a flow diagram of an exemplary method in accordance with the present invention. Initially, logic 120 determines whether the radio interface layer has received a sleep state indication from the operating system 105 (step 205). As used herein, sleep and wake state indications are signalling between the radio interface layer and the modem used to control the sleep and wake states of operation. The operating system can be any type of operating system, such as Windows Mobile, Symbian, Linux or the like. When the radio interface layer receives a sleep state indication from operating system 105 ("Yes" path out of decision step 205), then logic 120 signals wireless modem 115 to enter a sleep state (step 210). Logic 125 then saves the last known mode of operation of operating system 105 and wireless modem 115 (step 215). The mode of operation is one of voice dispatch, voice interconnect, packet data or short message service (SMS), although additional modes of operation can be provided.

Logic 130 determines whether the radio interface layer has received a wake state indication from operating system 105 (step 220). When a wake state indication is received from operating system 105 ("Yes" path out of decision step 220), then logic 130 identifies the operating mode for the wake state (step 225) and reinitializes wireless modem 115 in the identified operating mode (step 230).

When the radio interface layer does not receive a wake indication from operating system 105, ("No" path out of decision step 220), then logic 135 determines whether the radio interface layer has received a notification from wireless modem 115 (step 235). As used herein, a notification is signalling between the network and modem, and then the modem and the radio interface layer, when there is an incoming voice dispatch, voice interconnect, packet data or SMS message. The notification is received by wireless modem 115 over a control channel and the notification is typically a call setup request notification that can identify an assigned traffic channel, if desired. The control channel may be a physical or logical communication path that carries signalling messages and the traffic channel may be a physical or logical communication path for carrying voice dispatch, voice interconnect, packet data or SMS traffic. It should be recognized, however, that in some systems packet data and/or SMS traffic can be carried over control channels. When the radio interface layer has not received a notification from wireless modem 115 ("No" path out of decision step 235), then logic 130 continues to determine whether a wake state indication is received from operating system 105 (step 220).

When a notification is received from wireless modem 115 ("Yes" path out of decision step 235), then logic 140 determines the type of notification received from wireless modem 115 (step 240). When the notification is for a voice dispatch call ("Yes" path out of decision step 245), then logic 145 reinitializes operating system 105 and wireless modem 115 for a voice dispatch call accounting for the saved mode (step 250). The reinitialization accounts for the saved by mode by passing the appropriate parameters to the modem depending on what state it was in when it entered sleep mode. When the notification is for a voice interconnect call ("Yes" path out of decision step 255), then logic 145 reinitializes operating system 105 and wireless modem 115 for a voice interconnect call accounting for the saved mode (step 260). When the notification is for a packet data call ("Yes" path out of decision step 265), then logic 145 reinitializes operating system 105 and wireless modem 115 for a packet data call accounting for the saved mode (step 270). When the notification is not for a packet data call or is for a short message service (SMS) call ("No" path out of decision step 265), then the packet is for a short message service (SMS) call, and logic 145 reinitializes operating system 105 and wireless modem 115 for a short message service (SMS) call accounting for the saved mode (step 275).

Although the method of FIG. 2 has been described in which acts are performed in a particular order, in some cases these acts can be performed in a different order and/or some acts can be performed in parallel. For example, the last known mode of the operating system and modem can be saved (step 215) prior to signalling the modem to enter a sleep state (step 210).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a wireless modem by a radio interface layer (RIL), the method comprising the acts of:
   receiving, by the radio interface layer, a notification from the wireless modem;
   determining, by the radio interface layer, a type of call associated with the notification; and
   initializing the wireless modem based on the determined type of call, wherein the determined type of call is a call selected from a group that includes at least a dispatch voice call.

2. The method of claim 1, wherein the group also includes an interconnect voice call, a packet data call and a short message service (SMS) call.

3. The method of claim 1, further comprising the act of saving a last known mode of operation of the wireless modem.

4. The method of claim 3, wherein the wireless modem is initialized based on the determined type of call and the last known mode of operation of the wireless modem.

5. The method of claim 1, further comprising the acts of:
   initializing, by the radio interface layer, an operating system based on the determined type of call.

6. The method of claim 5, further comprising:
   saving a last known mode of operation of the operating system.

7. The method of claim 6, wherein the operating system is initialized based on the determined type of call and the last known mode of operation of the operating system.

8. The method of claim 1, wherein the wireless modem receives the notification from a control channel.

9. A wireless communication station comprising:
   an operating system;
   a wireless modem; and
   a radio interface layer (RIL) coupled to the operating system and wireless modem, wherein the radio interface layer comprises logic for receiving a notification from the wireless modem;
   logic for determining a type of call associated with the notification; and
   logic for initializing the wireless modem based on the determined type of call, wherein the determined type of call is a call selected from a group that includes at least a dispatch voice call.

10. The wireless communication station of claim 9, wherein the group also includes an interconnect voice call, a packet data call and a short message service (SMS) call.

11. The wireless communication station of claim 9, wherein the radio interface layer further comprises:
    logic for saving a last known mode of operation of the wireless modem.

12. The wireless communication station of claim 11, wherein the wireless modem is initialized based on the determined type of call and the last known mode of operation of the wireless modem.

13. The wireless communication station of claim 9, wherein the radio interface layer further comprises:
    logic for initializing an operating system based on the determined type of call.

14. The wireless communication station of claim 13, wherein the radio interface layer further comprises:
    logic for saving a last known mode of operation of the operating system.

15. The wireless communication station of claim 14, wherein the operating system is initialized based on the determined type of call and the last known mode of operation of the operating system.

16. The wireless communication station of claim 9, wherein the wireless modem receives the notification from a control channel.

17. The method of claim 3, wherein the last known mode of operation of the wireless modem includes a last type of call for which the modem has been initialized at a time when the modem enters a power saving mode of operation.

18. The method of claim 6, wherein the last known mode of operation of the operating system includes a last type of call for which the operating system has been initialized at a time when the operating system enters a power saving mode of operation.

* * * * *